United States Patent
Yoshida et al.

(10) Patent No.: US 11,718,295 B2
(45) Date of Patent: Aug. 8, 2023

(54) AUTOMATIC DRIVING ROBOT CONTROL DEVICE AND CONTROL METHOD

(71) Applicant: Meidensha Corporation, Tokyo (JP)

(72) Inventors: Kento Yoshida, Tokyo (JP); Hironobu Fukai, Tokyo (JP)

(73) Assignee: Meidensha Corporation, Tokyo (JP)

( * ) Notice: Subject to any disclaimer, the term of this patent is extended or adjusted under 35 U.S.C. 154(b) by 0 days.

(21) Appl. No.: 17/794,057

(22) PCT Filed: Dec. 22, 2020

(86) PCT No.: PCT/JP2020/047787
§ 371 (c)(1),
(2) Date: Jul. 20, 2022

(87) PCT Pub. No.: WO2021/149435
PCT Pub. Date: Jul. 29, 2021

(65) Prior Publication Data
US 2023/0038802 A1    Feb. 9, 2023

(30) Foreign Application Priority Data
Jan. 22, 2020  (JP) ................. 2020-007945

(51) Int. Cl.
*B60W 30/14*   (2006.01)
*B60W 60/00*   (2020.01)
(Continued)

(52) U.S. Cl.
CPC ........ *B60W 30/143* (2013.01); *B60W 40/105* (2013.01); *B60W 50/0097* (2013.01);
(Continued)

(58) Field of Classification Search
CPC ............ B60W 30/143; B60W 60/001; B60W 40/105; B60W 50/0097; B60W 2556/10; G06N 3/08; G06N 5/04
See application file for complete search history.

(56) References Cited

U.S. PATENT DOCUMENTS

2016/0026182 A1*  1/2016  Boroditsky .............. G08G 1/22
                                                      701/23
2019/0072968 A1*  3/2019  Will, IV .............. G08G 1/0129
(Continued)

FOREIGN PATENT DOCUMENTS

JP   H0471933 A   3/1992
JP   H04194724 A  7/1992
(Continued)

OTHER PUBLICATIONS

Machine translation of JP2002014009A.
(Continued)

*Primary Examiner* — Peter D Nolan
*Assistant Examiner* — Wae L Louie
(74) *Attorney, Agent, or Firm* — Servilla Whitney LLC

(57) ABSTRACT

[Problem] To provide an automatic driving robot control device and control method that enable a vehicle to be operated smoothly while also being caused to conform to a command vehicle speed with high accuracy.
[Solution] The present invention provides an automatic driving robot (drive robot) 4 control device 10 that controls the automatic driving robot 4, which is installed in a vehicle 2 and causes the vehicle 2 to run, such that the vehicle 2 runs in accordance with a defined command vehicle speed, wherein the automatic driving robot 4 control device 10 is provided with: a running state acquisition unit 22 that acquires a running state of the vehicle 2 including a vehicle speed and the command vehicle speed; an operation content inference unit 31 that infers, on the basis of the running state,
(Continued)

an operation sequence, which is a sequence of operations of the vehicle 2 at a plurality of times in the future that causes the vehicle 2 to run in accordance with the command vehicle speed, by using an operation inference learning model 40 that was trained by machine learning to infer the operation sequence; and a vehicle operation control unit 23 that extracts, from each of the operation sequences inferred a plurality of times in the past, the operations corresponding to a control time for subsequently controlling the automatic driving robot 4, calculates a weighted sum of these extracted plurality of operations to calculate a final operation value, generates, on the basis of the final operation value, a control signal for controlling the automatic driving robot 4, and transmits the control signal to the automatic driving robot 4.

7 Claims, 8 Drawing Sheets

(51) Int. Cl.
*B60W 40/105* (2012.01)
*B60W 50/00* (2006.01)
*G06N 3/08* (2023.01)
*G06N 5/04* (2023.01)

(52) U.S. Cl.
CPC ............ *B60W 60/001* (2020.02); *G06N 3/08* (2013.01); *G06N 5/04* (2013.01); *B60W 2556/10* (2020.02)

(56) References Cited

U.S. PATENT DOCUMENTS

| | | | |
|---|---|---|---|
| 2020/0398842 A1* | 12/2020 | Yoshida | B60W 30/188 |
| 2021/0229656 A1* | 7/2021 | Dax | B60W 30/0956 |
| 2022/0143823 A1* | 5/2022 | Yoshida | G06N 3/088 |
| 2023/0038802 A1* | 2/2023 | Yoshida | B60W 40/105 |

FOREIGN PATENT DOCUMENTS

| | | |
|---|---|---|
| JP | H06105414 A | 4/1994 |
| JP | 2002014009 A | 1/2002 |
| JP | 2016156687 A | 9/2016 |
| JP | 2019138273 A | 8/2019 |

OTHER PUBLICATIONS

Machine translation of JP2016156687A.
Machine translation of JPH04194724A.
Machine translation of JPH0471933A.
Machine translation of JPH06105414A.

* cited by examiner

AUTOMATIC DRIVING ROBOT CONTROL DEVICE AND CONTROL METHOD

CROSS-REFERENCE TO RELATED APPLICATIONS

This application is the National Stage entry of PCT/JP2020/047787, filed on Dec. 22, 2020, which claims priority to Japan Application Serial No. 2020-007945, filed Jan. 22, 2020, the entire disclosures of which are hereby incorporated by reference herein.

TECHNICAL FIELD

The present invention relates to a control device and a control method for an automatic driving robot that causes a vehicle to run.

BACKGROUND

Generally, when manufacturing and selling a vehicle such as a standard-sized automobile, the fuel economy and exhaust gases when the vehicle is run in a specific running pattern (mode), defined by the country or by the region, must be measured and displayed.

The mode may be represented, for example, by a graph of the relationship between the time elapsed since the vehicle started running and a vehicle speed to be reached at that time. This vehicle speed to be reached is sometimes referred to as a command vehicle speed from the perspective of being a command provided to the vehicle regarding the speed to be reached.

Tests regarding the fuel economy and exhaust gases as mentioned above are performed by mounting the vehicle on a chassis dynamometer and having an automatic driving robot, i.e., a so-called drive robot (registered trademark), which is installed in the vehicle, drive the vehicle in accordance with the mode.

A tolerable error range is defined for the command vehicle speed. If the vehicle speed deviates from the tolerable error range, the test becomes invalid. Thus, high conformity to the command vehicle speed is demanded of an automatic driving device.

To address this, Patent Document 1 discloses a vehicle speed control device having an objective of enhancing vehicle speed conformity and facilitating setting that is carried out in advance.

The vehicle speed control device of Patent Document 1 is based on existing feedback control rules such as, for example, PID control rules, etc.

Further, in recent years, in order to further enhance conformity to a command vehicle speed, there are cases in which a drive robot is controlled by using a learning model that has undergone machine learning by techniques such as reinforcement learning, etc., such that when a present state of a vehicle is inputted, operations causing the vehicle to run in accordance with the command vehicle speed are inferred.

However, in these cases, learning models sometimes infer an operation which greatly differs from a preceding inference. For example, in cases in which a learning model infers operation levels of an accelerator pedal and a brake pedal, suppose that at a given time, the learning model infers an operation that sets the accelerator pedal to on and sets the brake pedal to off. Thereafter, in the next inference, the learning model may infer an operation that sets the accelerator pedal to off and sets the brake pedal to on, and in the next inference, may infer an operation that again sets the accelerator pedal to on and sets the brake pedal to off. If such a sequence, in which abrupt operations having a large operation level are carried out meticulously and repeatedly in a short time period, is applied in a drive robot, there is a possibility that a measured performance will be worse than the fuel economy and exhaust gas performance that a vehicle intrinsically has.

In order to smooth a sequence of meticulous operations having a large operation level such as that described above, it is possible to consider amending a value of an operation, for an operation inferred by a learning model, by calculating a moving average of operation levels including operations at a time in the past which were inferred in the past or actually applied to a drive robot in the past. Alternatively, when a sequence of operations inferred from the past to the present is regarded as a function with respect to time, the operations may also be amended so as to become smooth by applying a low pass filter to this function.

CITATION LIST

Patent Literature

Patent Document 1: JP 2016-156687 A

SUMMARY OF INVENTION

Technical Problem

Amendments by means of a moving average of learning model inference results or a low pass filter, etc., as mentioned above are amendments in which a value of an operation inferred at a present time is amended by using a value of an operation at a time in the past. Accordingly, a value of an operation to be applied to a drive robot at a present time is changed due to receiving an influence of a value of an operation in the past. FIG. 9 shall be used to describe this phenomenon. Line L1 in FIG. 9 is a line in which operation inference results by a learning model are plotted with the horizontal axis serving as the time axis. Line L2 is a line that plots operations obtained by amending the operation inference results by the learning model by using a moving average or a low pass filter, etc.

Consider, for example, the case in which the learning model infers a result such as that shown as point P1 at time T1. In FIG. 9, at times T2 and T3, prior to this time T1, the operation level is larger than that at point P1. In such a case, when a moving average or low pass filter, etc., is applied to the operation level P1, which is an inference result, as shown as point P4, a value of an operation is amended such that an influence of a past operation level is received and the value becomes larger than the inference result. That is, although it is actually desirable for a smaller level of operation to be applied, the level of operation is amended such that the value thereof becomes larger. Due thereto, as shown in FIG. 9, when attempting to apply to a drive robot, for example, a series of operations which should cause a value to change gradually, an operation that is more delayed than a desired operation is actually applied.

For the reasons described above, when inference results from a learning model are amended by using a moving average or a low pass filter, etc., operations become smoother but since the influence of past inference results is inevitably received, delays in operations of a vehicle occur and conformity to a command vehicle speed decreases.

The problem that the present invention attempts to solve is to provide a control device and a control method for an automatic driving robot (drive robot), the control device and control method enabling a vehicle to be operated smoothly while also being caused to conform to a command vehicle speed with high accuracy.

Solution to Problem

The present invention employs the following means to solve the problem described above. That is, the present invention provides an automatic driving robot control device that controls an automatic robot, which is installed in a vehicle and causes the vehicle to run, such that the vehicle runs in accordance with a defined command vehicle speed, wherein the automatic driving robot control device is provided with: a running state acquisition unit that acquires a running state of the vehicle including a vehicle speed and the command vehicle speed; an operation content inference unit that infers, on the basis of the running state, an operation sequence, which is a sequence of operations of the vehicle at a plurality of times in the future that causes the vehicle to run in accordance with the command vehicle speed, by using an operation inference learning model that was trained by machine learning to infer the operation sequence; and a vehicle operation control unit that extracts, from each of the operation sequences inferred a plurality of times in the past, the operations corresponding to a control time for subsequently controlling the automatic driving robot, calculates a weighted sum of these extracted plurality of operations to calculate a final operation value, generates, on the basis of the final operation value, a control signal for controlling the automatic driving robot, and transmits the control signal to the automatic driving robot.

Further, the present invention provides an automatic driving robot control method for controlling an automatic driving robot, which is installed in a vehicle and causes the vehicle to run, such that the vehicle runs in accordance with a defined command vehicle speed, wherein the automatic driving robot control method comprises: acquiring a running state of the vehicle including a vehicle speed and the command vehicle speed; inferring, on the basis of the running state, an operation sequence, which is a sequence of operations of the vehicle at a plurality of times in the future that causes the vehicle to run in accordance with the command vehicle speed, by using an operation inference learning model trained by machine learning to infer the operation sequence; extracting, from each of the operation sequences inferred a plurality of times in the past, the operations corresponding to a control time for subsequently controlling the automatic driving robot; calculating a weighted sum of these extracted plurality of operations to calculate a final operation value; generating, on the basis of the final operation value, a control signal for controlling the automatic driving robot; and transmitting the control signal to the automatic driving robot.

Effects of Invention

According to the present invention, it is possible to provide an automatic driving robot (drive robot) control device and control method which enable a vehicle to be operated smoothly while also being caused to follow a command vehicle speed with high accuracy.

DESCRIPTION OF EMBODIMENTS

Figure 1:
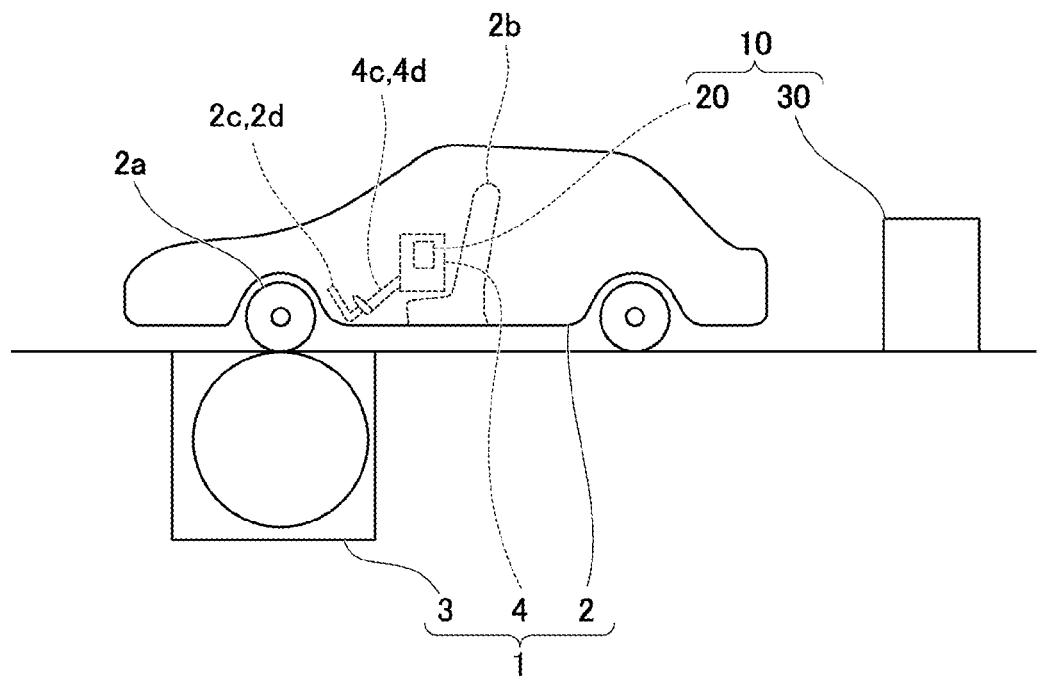
FIG. 1 is an explanatory diagram of a testing environment using an automatic driving robot (drive robot) in an embodiment of the present invention.

Hereinafter, an embodiment of the present embodiment will be explained in detail by referring to the drawings.

FIG. 1 is an explanatory diagram of a testing environment using a drive robot in the embodiment. A testing device 1 is provided with a vehicle 2, a chassis dynamometer 3, and a drive robot 4.

The vehicle 2 is disposed on a floor surface. The chassis dynamometer 3 is disposed below the floor surface. The vehicle 2 is positioned such that a drive wheel 2a of the vehicle 2 is mounted on the chassis dynamometer 3. When the vehicle 2 runs and the drive wheel 2a rotates, the dynamometer 3 rotates in the opposite direction thereto.

The drive robot 4 is installed on a driver's seat 2b of the vehicle 2 and causes the vehicle 2 to run. The drive robot 4 is provided with a first actuator 4c and a second actuator 4d, which are disposed so as to be in contact with, respectively, an accelerator pedal 2c and a brake pedal 2d of the vehicle 2.

The drive robot 4 is controlled by a control device 10. More specifically, by controlling the first actuator 4c and the second actuator 4d of the drive robot 4, the control device 10 changes and adjusts depression levels of the accelerator pedal 2c and the brake pedal 2d of the vehicle 2.

The control device 10 controls the drive robot 4 so that the vehicle 2 runs in accordance with a defined command vehicle speed. That is, the control device 10 controls the running of the vehicle 1 so as to follow a defined running pattern (mode) by changing the depression levels of the accelerator pedal 2c and the brake pedal 2d of the vehicle 2. More specifically, the control device 10 controls the running of the vehicle 2 so as to follow the command vehicle speeds that are vehicle speeds to be reached at various times as time elapses after the vehicle starts running.

The control device 10 is provided with a drive robot control unit 20 and a learning unit 30 which are disposed in a manner allowing communication with one another.

The drive robot control unit 20 controls the drive robot 4 by generating a control signal for controlling the drive robot 4 and transmitting the control signal to the drive robot 4. The learning unit 30 performs reinforcement learning for a machine learning apparatus such as that described later and generates a learning model. On the basis of an output of this learning model, a control signal for controlling the drive robot 4 is generated.

The drive robot control unit 20 is, for example, an information processing device such as a controller, etc., provided to an exterior section of a housing of the drive robot 4. The learning unit 30 is, for example, an information processing device such as a personal computer, or the like.

Figure 2:
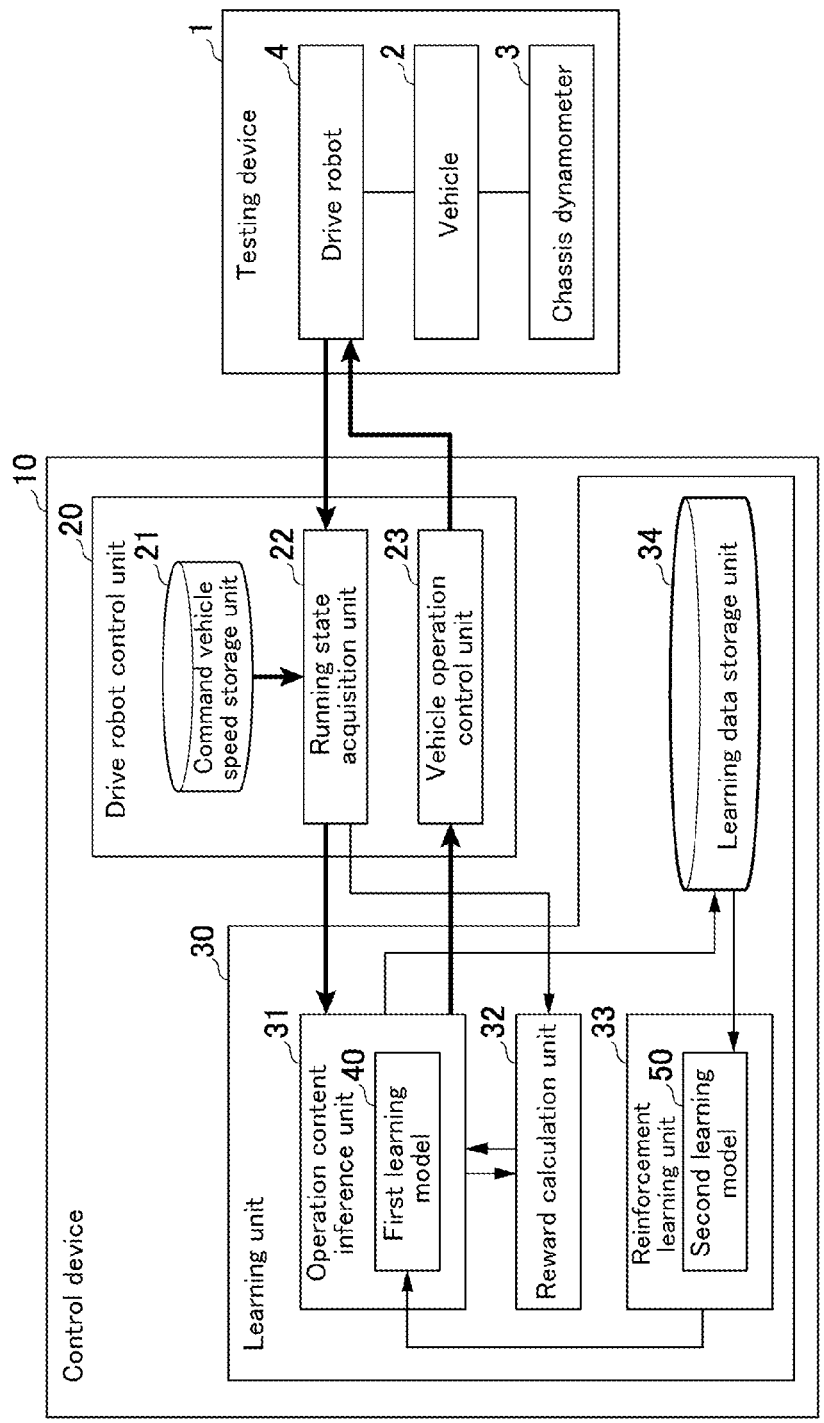
FIG. 2 is a block diagram of an automatic driving robot control device in the embodiment above.

FIG. 2 is a block diagram of the control device 10. The drive robot control unit 20 is provided with a command vehicle speed storage unit 21, a running state acquisition unit 22, and a vehicle operation control unit 23. The learning unit 30 is provided with an operation content inference unit 31, a reward calculation unit 32, a reinforcement learning unit 33, and a learning data storage unit 34.

Among these elements of the control device 10, the running state acquisition unit 22, the vehicle operation control unit 23, the operation content inference unit 31, the reward calculation unit 32, and the reinforcement learning unit 33 may, for example, be software or a program executed by a CPU inside the information processing devices described above. Further, the command vehicle speed storage unit 21 and the learning data storage unit 34 may be realized by a storage device such as a semiconductor memory or a magnetic disk provided inside or outside the information processing devices described above.

As described later, the operation content inference unit 31 infers, on the basis of a running state at a given time, an operation sequence, which is a sequence of operations of the vehicle 2 after that time. In order to carry out this inference of an operation sequence of the vehicle 2 effectively, as explained below, the operation content inference unit 31, in particular, is provided with a machine learning apparatus, and generates a learning model (first learning model, operation inference learning model) 40 by training the machine learning apparatus by reinforcement learning based on rewards calculated on the basis of running states at times after operation of the drive robot 4 based on an inferred operation sequence. When the running of the vehicle 2 is actually controlled for performance measurement, the operation content inference unit 31 uses this first learning model (operation inference learning model) 40, in which the training has finished, to infer an operation sequence of the vehicle 2.

That is, the control device 10 largely performs two types of actions, namely, the learning of an operation sequence during reinforcement learning, and the inference of an operation sequence when controlling the running of the vehicle for performance measurement. To simplify explanations, hereinafter, the constituent elements of the control device 10 at the time of learning an operation sequence are explained first, and thereafter, the activity of the constituent elements when inferring an operation sequence during performance measurement of the vehicle 2 is explained.

In FIG. 2, the constituent elements are joined by two types of arrows: arrows having thick lines and arrows having thin lines. FIG. 2 shows data and process flows. Data and process flows when an operation sequence is inferred during performance measurement of the vehicle 2 are shown by the thick lines. Data and process flows at a time of learning an operation sequence are shown by the arrows of both the thick lines and the thin lines.

First, the activity of the constituent elements of the drive robot control unit 20 at a time of learning an operation sequence will be explained.

Command vehicle speeds which are generated on the basis of information about a mode are stored in the command vehicle speed storage unit 21. A mode is, for example, a relationship between a time that has elapsed from running commencement and a vehicle speed to be reached at that time. Accordingly, the command vehicle speed storage unit 21 actually has stored therein tables, graphs, and functions, etc., representing relationships between elapsed times and command vehicle speeds.

The running state acquisition unit 22 acquires a running state of the vehicle 2 at a present point in time. The running state of the vehicle 2 may be acquired from various measuring instruments (not shown) that the vehicle 2 is provided with or operation history stored inside the drive robot 4 that operates the vehicle 2. That is, the running state of the vehicle 2 quantifies and represents an action state of the vehicle 2 at a present point in time. A means for acquiring this value is not limited to a value measured by a measuring instrument of the vehicle 2 and also includes a value which can be acquired by the drive robot 4.

Included as running states are: an operation level, among the operation history of the drive robot 4, of an accelerator pedal operation from a preceding running state acquisition time (hereinafter referred to as an accelerator pedal detection level); an operation level, among the operation history of the drive robot 4, of a brake pedal operation from a preceding running state acquisition time (hereinafter referred to as a brake pedal detection level); an engine rotation speed detected in the vehicle 2 (hereinafter referred to as an engine rotation speed detection level); and a vehicle speed detected in the vehicle 2 (hereinafter referred to as a detected vehicle speed).

The running state further includes a command vehicle speed that the vehicle 2 should realize at the time that the running state is acquired.

Each of the running states described above may be a scalar value and may also be realized by a plurality of values.

Each of the running states is mainly used as an input when training a machine learning apparatus, which is described later, in order to generate a learning model (first learning model 40). Due thereto, for each of the running states, by acquiring a value not only at the time that a running state is acquired, but also at a plurality of times before and after that time, and using the acquired values as inputs to a machine learning apparatus, it is possible to be able to utilize past processes and future inferences to perform training more effectively.

For example, with respect to a running state such as an accelerator pedal detection level, a brake pedal detection level, an engine rotation speed detection level, and a detected vehicle speed, etc., that can be acquired by actually observing and measuring a state of the vehicle 2, when an observation data reference time $T_{obs}$ is defined as a reference time of past observation data to be used in a learning algorithm of the machine learning apparatus, there may be a plurality of values as an observation data reference time $T_{obs}$ sequence.

Further, with respect to a command vehicle speed which, unlike observation data such as those described above, has values which are stored in the command vehicle speed storage unit 21 and is in a state in which values from all times can be referred to as needed, when a command vehicle speed reference time $T_{ref}$ is defined as a reference time of future command vehicle speeds to be used in a learning algorithm of a machine learning apparatus, there may be a plurality of values as a command vehicle speed reference time $T_{ref}$ sequence.

In the present embodiment, each of the running states is realized by a plurality of values.

The running state acquisition unit 22 acquires an accelerator pedal detection level, a brake pedal detection level, an engine rotation speed detection level, and a detected vehicle speed from various measuring instruments (not shown) that the vehicle 2 is provided with or operation history stored inside the drive robot 4, etc.

Further, the running state acquisition unit 22 acquires a command vehicle speed from the command vehicle speed storage unit 21.

The running state acquisition unit 22 transmits these acquired running states to the learning unit 30.

The vehicle operation control unit 23 receives an operation sequence that was inferred by an operation content inference unit 31, which is described next, on the basis of a transmission state transmitted by the running state acquisition unit 22, and on the basis of the received operation sequence, the vehicle operation control unit 23 generates a control signal for controlling the drive robot 4 and transmits the signal to the drive robot 4.

Next, the activity of the constituent elements of the learning unit 30 at a time of learning an operation sequence will be explained.

The operation content inference unit 31 of the learning unit 30 is provided with a machine learning apparatus. This machine learning apparatus undergoes reinforcement learning to generate a first learning model 40 (operation inference learning model). The first learning model 40 is used to infer an operation sequence of the vehicle 2. In the present embodiment, the machine learning apparatus undergoes machine learning by reinforcement learning. That is, the machine learning apparatus generates a learned model 40 that has learned appropriate learning parameters and that is to be used as a program module constituting a portion of artificial intelligence software.

The learning unit 30 accumulates running data which are to serve as inputs required for reinforcement learning when the machine learning apparatus undergoes reinforcement learning. Running data are accumulated by the control device 10 controlling running of the vehicle 2 by using operations inferred by the machine learning apparatus which has not finished learning and is midway through learning. After the machine learning apparatus has undergone reinforcement learning using these running data, these operations which serve as outputs are used to accumulate running data again and the machine learning apparatus undergoes training again. Thus, by repeatedly updating the machine learning apparatus, there is ultimately generated a learned first learning model 40 obtained by reinforcement learning.

Hereinafter, in order to simplify explanations, both the machine learning apparatus that the operation content inference unit 31 is provided with and the learning model generated by training the machine learning apparatus are referred to as the first learning model 40.

Upon receiving running states from the running state acquisition unit 22 at a given time (first time), the operation content inference unit 31 infers, on the basis thereof, an operation series of the vehicle 2 subsequent to the first time by using the first learning model 40 being learned.

The first learning model 40 infers an operation sequence of the vehicle 2 in a prescribed first time interval. This inference time interval in the first learning model 40 is hereinafter referred to as a step cycle $T_{step}$.

As described later, the drive robot control unit 20 transmits a control signal for controlling the drive robot 4 to the drive robot 4 in a prescribed second time interval. When this control signal transmission interval is represented by control cycle $T_s$, the step cycle $T_{step}$ in the present embodiment is a larger value than the control cycle $T_s$. Due thereto, by a single inference, the first learning model 40 outputs a plurality of operations of the vehicle 2, i.e., an operation sequence, corresponding to a plurality of control cycles $T_s$ included in the step cycle $T_{step}$.

Further, as described above, the first learning model 40 infers an operation sequence of the vehicle 2 at a plurality of times in the future from after the first time to at least after the step cycle $T_{step}$. However, in the present embodiment, the time interval which is the target of this inference is greater than the step cycle $T_{step}$. That is, simultaneously with inferring operations of the vehicle 2 within a time range up until after the step cycle $T_{step}$, the first learning model 40 actually infers operations of the vehicle 2 at a time further in the future than after the step cycle $T_{step}$ as the same operation sequence. This time range for making inferences by using the first learning model 40 is referred to as an action output time $T_{pred}$. In this case, the operation content inference unit 31 uses the first learning model 40 to infer, as a sequence, operations at a plurality of times corresponding to a plurality of control cycles $T_s$ within a time range from the first time to after the action output time $T_{pred}$.

In such a case, when inferring an operation sequence up to after the step cycle $T_{step}$ in which the vehicle 2 is actually operated, since operations of the vehicle 2 are inferred at a time further after the step cycle $T_{step}$, it is possible for the first learning model 40 to make an inference in which future circumstances are anticipated.

Figure 3:
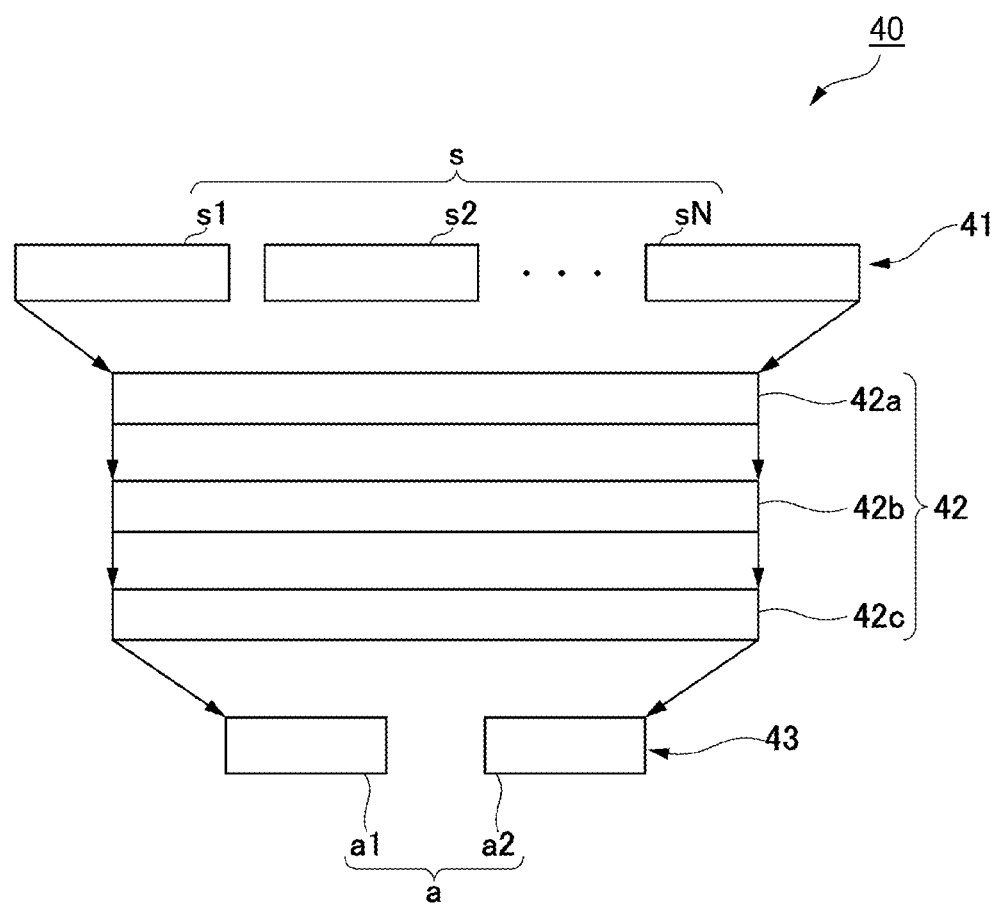
FIG. 3 is a block diagram of a first learning model (operation inference learning model) provided in the control device above.

FIG. 3 is a block diagram of the first learning model 40.

In the present embodiment, the first learning model 40 is realized by a fully connected neural network having a total of five layers, with three of the layers being configured as intermediate layers. The first learning model 40 is provided with an input layer 41, intermediate layers 42, and an output layer 43.

In FIG. 3, each layer is depicted as a rectangle and nodes included in each layer are omitted.

The input layer 41 is provided with a plurality of input nodes. Each of the plurality of input nodes is provided so as to correspond to each of the running states s, for example, from an accelerator pedal detection level s1 and a brake pedal detection level s2 to a command vehicle speed sN.

As already explained, each of the running states s is realized by a plurality of values. For example, an input corresponding to the accelerator pedal detection level s1, which is shown as one rectangle in FIG. 3, is actually provided with input nodes corresponding to each of a plurality of values of the accelerator pedal detection level s1.

Each of the input nodes has stored therein a corresponding value of a running state s received from the running state acquisition unit 22.

The intermediate layers 42 include a first intermediate layer 42a, a second intermediate layer 42b, and a third intermediate layer 42c.

In each node in the intermediate layers 42, from the nodes in the preceding layer (for example, the input layer 41 in the case of the first intermediate layer 42a, and the first intermediate layer 42a in the case of the second intermediate layer 42b), calculations are performed on the basis of the values stored in the nodes in the preceding layer and weights from the nodes in the preceding layer to the nodes in the intermediate layers 42, and the calculation results are stored in the nodes in that intermediate layer 42.

In the output layer 43, too, calculations similar to those in the intermediate layers 42 are performed, and calculation results are stored in the output nodes provided in the output layer 43. Each of the plurality of output nodes is provided so as to correspond to each operation sequence a. In the present embodiment, the targets for operation in the vehicle 2 are the accelerator pedal 2c and the brake pedal 2d, and in accordance therewith, the operation sequences a are, for example, an accelerator pedal operation sequence a1 and a brake pedal operation sequence a2.

As already explained, each operation sequence a is realized by a plurality of values. For example, an output corresponding to the accelerator pedal operation sequence a1, which is shown as one rectangle in FIG. 3, is actually provided with output nodes corresponding to each of a plurality of values of the accelerator pedal operation sequence a1.

As described above, the operation content inference unit 31 infers, on the basis of a running state s at the first time, an operation sequence a of the vehicle 2 up until the action output time $T_{pred}$ after the first time and transmits the operation sequence a to the vehicle operation control unit 23 of the drive robot control unit 20.

On the basis of this operation sequence a, the vehicle operation control unit 23 operates the drive robot 4 during a step cycle $T_{step}$.

In addition, the running state acquisition unit 22 again acquires a running state s of the vehicle 2, after operation, at a second time subsequent to the first time.

The operation content inference unit 31 transmits, to the reward calculation unit 32, which is described next, a running state s at the first time, an operation sequence a inferred in correspondence therewith and actually executed, and a running state s at the second time.

The reward calculation unit 32 receives, from the operation content inference unit 31, the running state s at the first time, the operation sequence a, and the running state s at the second time. The reward calculation unit 32 calculates a reward. The reward is designed to have a smaller value when the operation sequence a and the running state s at the second time with the operation sequence a are less desirable, and to have a larger value when the operation sequence a and the running state s are more desirable. The reinforcement learning unit 33, which will be described below, calculates an action value (evaluation value) so as to be higher when the reward is larger, and the first learning model 40 is trained by reinforcement learning so as to output an operation sequence a that makes this action value higher.

The reward calculation unit 32 transmits, to the learning data storage unit 34, the running state s at the first time, the operation sequence a inferred in correspondence therewith, the running state s at the second time newly generated on the basis of the operation sequence a, and the calculated reward, and the foregoing are saved in the learning data storage unit 34.

In this manner, the inference of the operation sequence a, the acquisition of the running state s after the operation sequence a is executed by the drive robot 4, and the calculation of rewards are repeatedly performed until sufficient data for reinforcement learning are accumulated.

When a sufficient amount of running data for reinforcement learning is accumulated in the learning data storage unit 34, reinforcement learning is executed by the reinforcement learning unit 33 which will be explained next.

The reinforcement learning unit 33 acquires a plurality of running data from the learning data storage unit 34 and uses these data to learn a second learning model 50. Due to the training of the machine learning apparatus, the second learning model 50 becomes a learned model that has learned appropriate learning parameters and that is to be used as a program module constituting a portion of artificial intelligence software.

The learning unit 30, overall, calculates an action value indicating how appropriate the operation sequence a inferred by the first learning model 40 was, and the learning model 40 is trained by reinforcement learning so as to output an operation sequence a that make this action value higher. The action value is represented as a function Q that has the running state s and the operation sequence a corresponding thereto as arguments, and is designed so that an action value Q becomes higher as the reward becomes larger. In the present embodiment, this function Q is calculated by the second learning model 50, serving as a function approximator, designed to take the running state s and the operation sequence a as inputs, and to output the action value Q.

Figure 4:
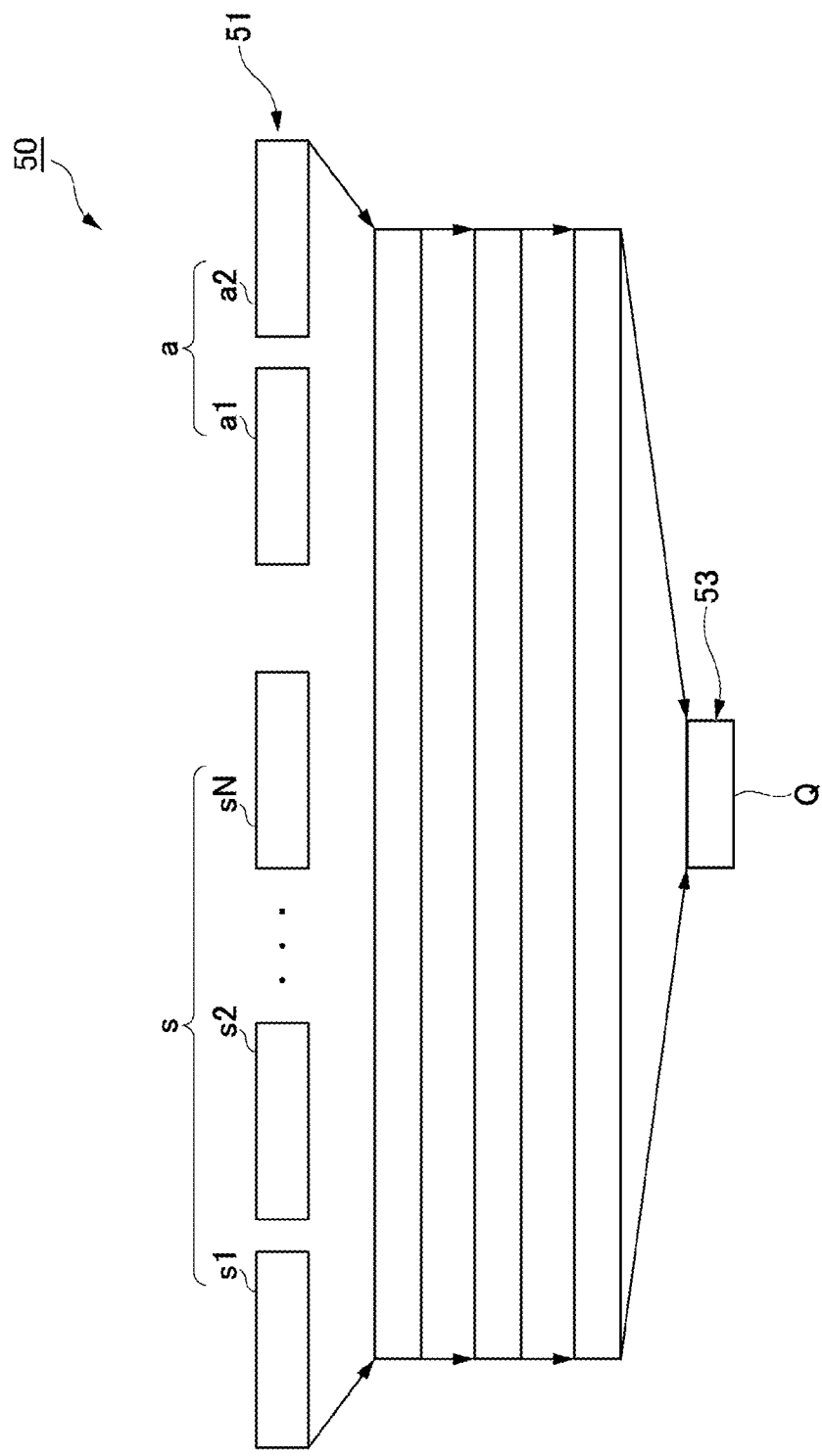
FIG. 4 is a block diagram of a second learning model to be used in reinforcement learning of the first learning model above.

The reinforcement learning unit 33 receives the running state s and the operation sequence a from the learning data storage unit 34 and trains the second learning model 50 by machine learning. FIG. 4 is a block diagram of the second learning model 50.

In an input layer 51 of the second learning model 50, input nodes are provided so as to correspond to each of the running states s, for example, from an accelerator pedal detection level s1 and a brake pedal detection level s2 to a command vehicle speed sN, and to each of the operation sequences a, for example, of the accelerator pedal operation sequence a1 and the brake pedal operation sequence a2. The second learning model 50 is realized by a neural network having a structure similar to that of the first learning model 40. Thus, a detailed structural explanation will be omitted.

In an output layer 53 of the first learning model 40, there is, for example, one output node, which corresponds to the calculated value of the action value Q.

The reinforcement learning unit 33 uses the error backpropagation method and the stochastic gradient descent method to adjust the values of the parameters constituting the neural network, such as weight and bias values, so as to reduce the TD (Temporal Difference) error, i.e., the error between the action value before executing the operation sequence a and the action value after executing the operation sequence a, so that an appropriate value is outputted as the action value Q. In this way, the second learning model 50 is trained so as to be able to appropriately evaluate the operation sequence a inferred by the current first learning model 40.

When the training of the second learning model 50 proceeds, the second learning model 50 outputs a more appropriate value of the action value Q. That is, the value of the action value Q outputted by the second learning model 50 changes from the value before training. Thus, in conjunction therewith, the first learning model 40 that has been designed to output an operation sequence a making the action value Q higher must be updated. For this reason, the operation content inference unit 31 trains the first learning model 40.

Specifically, the operation content inference unit 31 trains the first learning model 40, for example, by representing negative values of the action value Q with a loss function, and by using the error backpropagation method and the stochastic gradient descent method to adjust the values of the parameters constituting the neural network, such as weight and bias values, so as to minimize the loss function, i.e., so as to output an operation sequence a that makes the action value Q larger.

When the first learning model 40 is trained and updated, the outputted operation sequence a changes. Thus, the running data are accumulated again and the second learning model 50 is trained on the basis thereof.

In this manner, by repeatedly training the first learning model 40 and the second learning model 50, the learning unit 30 trains these learning models 40, 50 by reinforcement learning.

Next, the activity of the constituent elements of the control device 10 when actually inferring an operation sequence during performance measurements of the vehicle 2, i.e., after the training of the first learning model 40 by reinforcement learning has finished, will be explained.

The running state acquisition unit 22 acquires a running state of the vehicle 2 at a present point in time.

The running state acquisition unit 22 acquires an accelerator pedal detection level, a brake pedal detection level, an engine rotation speed detection level, and a detected vehicle speed from various measuring instruments (not shown) that the vehicle 2 is provided with or operation history stored inside the drive robot 4, etc.

Further, the running state acquisition unit 22 acquires a command vehicle speed from the command vehicle speed storage unit 21.

The running state acquisition unit 22 transmits these acquired running states to the learning unit 30.

Upon acquiring a running state from the running state acquisition unit 22 at a given time (first time), the operation content inference unit 31 of the learning unit 30 infers, on the basis thereof, an operation series a of the vehicle 2 subsequent to the first time by using the trained first learning model 40.

The first learning model 40 is a learned model which is trained by reinforcement learning on the basis of a reward calculated on the basis of a running state s at the second time subsequent to the first time and after the drive robot 4 was operated on the basis of an operation sequence a.

The operation content inference unit 31 infers an operation sequence a of the vehicle 2 due to the execution, as a program on a CPU, for example, of the learned first learning model 40 which was trained by reinforcement learning in advance by the learning unit 30 and in which values of parameters constituting the neural network, such as weight and bias values, have been adjusted and determined.

The operation content inference unit 31 transmits the inferred operation sequence a to the vehicle operation control unit 23.

The vehicle operation control unit 23 receives the operation sequence a from the operation content inference unit 31 and operates the drive robot 4 by generating, on the basis of this operation sequence a, a control signal for controlling the drive robot 4 during the step cycle $T_{step}$, and transmitting the control signal to the drive robot 4.

Figure 5:
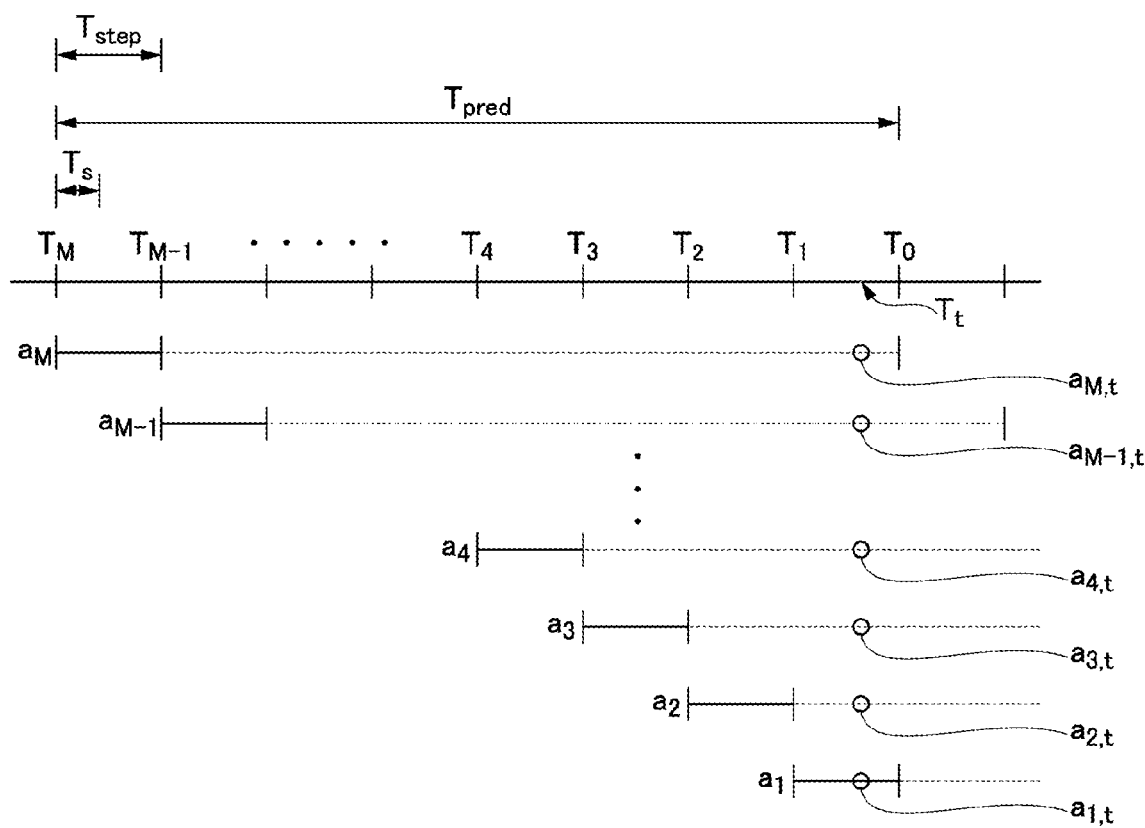
FIG. 5 is an explanatory diagram of a vehicle operation control unit of the control device above.

FIG. 5 is an explanatory diagram of the vehicle operation control unit 23.

FIG. 5 shows relationships of operation sequences as (i=1 to M) inferred by the operation content inference unit 31 at each of a plurality of times Ti (i=1 to M) for each step cycle $T_{step}$ which is an inference interval of the first learning model 40. In the present embodiment, each operation sequence $a_i$ (i=1 to M) is considered to be an accelerator pedal operation sequence a1. That is, the operation sequence should normally be written as operation sequence $a1_i$ (i=1 to M) but, to simplify notation, is written as operation sequence $a_i$ (i=1 to M). The operation sequence $a_i$ (i=1 to M) may also be a brake pedal operation sequence a2.

For the sake of explanation, values are shown such that the further back in the past is the time at which an operation sequence a was inferred, the larger is the value of the index i that is attached thereto. That is, the time furthest in the past among the times $T_i$ (i=1 to M) is $T_M$, and the operation sequence a corresponding thereto which was inferred by the operation content inference unit 31 at time $T_M$ is an operation sequence $a_M$. Further, the most recent time among the times $T_i$ (i=1 to M) is $T_1$, and the operation sequence a corresponding thereto is an operation sequence $a_1$.

At time $T_M$, the operation sequence $a_M$ from time $T_M$ to time $T_0$ is inferred by the operation content inference unit 31. Time $T_0$ is a time after the $T_{pred}$ of time $T_M$ and after the step cycle $T_{step}$ of time $T_1$. Further, at time $T_{M-1}$, the operation sequence $a_{M-1}$ from time $T_{M-1}$ to a time after $T_{pred}$ is inferred by the operation content inference unit 31. Thereafter, in the same manner, at time $T_1$ for example, the operation sequence $a_1$ from time $T_1$ to a time after $T_{pred}$ is inferred by the operation content inference unit 31.

Here, operations in a time from time $T_1$ to time $T_0$ are included in all M operation sequences a from the operation sequence $a_M$ to the operation sequence $a_1$. That is, at an arbitrary time $T_t$ from time $T_1$ to time $T_0$, M operations $a_{i,t}$ (i=1 to M) at the time $T_t$ are inferred at respectively different times $T_i$ (i=1 to M).

Even if the most recent operation sequence $a_1$ is inferred by the operation content inference unit 31, too, the vehicle operation control unit 23 does not generate a control signal for operating the drive robot 4 by using the most recent operation sequence $a_1$ as-is. The vehicle operation control unit 23 calculates, in the manner described below, a final operation value $a_t$, which is an operation to be actually used at a control time $T_t$ for actually carrying out control, on the basis of operations $a_{i,t}$ (i=1 to M) within an operation sequence $a_i$ (i=1 to M) inferred by the operation content inference unit 31 a plurality of times in the past including the most recent operation sequence $a_1$.

The vehicle operation control unit 23 internally stores weights $\alpha_i$ (i=1 to M) calculated by formula (1) below with the coefficient x being greater than 1.

Math. 1 \[SpanFromLeft]

$$\alpha_i = \frac{1}{\sum_{j=1}^{M} \left(\frac{1}{x}\right)^j} \cdot \left(\frac{1}{x}\right)^i \quad (1)$$

The sum of the weights $\alpha_i$ represented by the above formula from $\alpha_1$ to $\alpha_M$ is 1. The coefficient x is determined through experimentation carried out in advance such that the vehicle speed error when running of the vehicle 2 is controlled by the drive robot 4 is minimized.

The vehicle operation control unit 23 extracts, from each operation sequence $a_i$ (i=1 to M), a plurality of operation sequences $a_{i,t}$ inferred with respect to a control time $T_t$, and calculates a final operation value $a_t$ at the control time $T_t$ by using the following formula (2) to apply the weights $\alpha_i$ described above to each operation sequence $a_i$.

Math. 2 \[SpanFromLeft]

$$a_t = \sum_{i=1}^{M} \alpha_i a_{i,t} \quad (2)$$

At a point in time for calculating the final operation value $a_t$ at a control time $T_t$, other than the most recent operation sequence $a_1$, the operation sequences $a_i$ (i=2 to M), which include a time $T_t$ within a time period of the step cycle $T_{step}$ from a time corresponding to an initial operation of the operation sequence a, have been inferred in the past by the operation content inference unit 31. Accordingly, among the components of formula (2) above, it is possible to complete the calculation of the sum of $\alpha_i \times a_{i,t}$ (i=2 to M) at the time of inferring the most recent operation sequence $a_1$. By doing so, after the most recent operation sequence $a_1$ is inferred, it is possible to calculate the final operation value $a_t$ at time $T_t$ by simply calculating $\alpha_1 \times a_{i,t}$ and adding this to the sum described above.

As described above, for each time cycle $T_s$, the vehicle operation control unit 23 calculates a final operation value $a_t$ by extracting, from each operation sequence $a_i$ (i=1 to M) inferred a plurality of times in the past, an operation $a_{i,t}$ (i=1 to M) corresponding to a control time $T_t$ for subsequently controlling the drive robot 4, and calculating a weighted sum of these extracted plurality of operations $a_{i,t}$ (i=1 to M).

The vehicle operation control unit 23 controls the drive robot 4 by generating, on the basis of the final operation value $a_t$, a control signal for controlling the drive robot 4 and transmitting the control signal to the drive robot 4.

Figure 6:
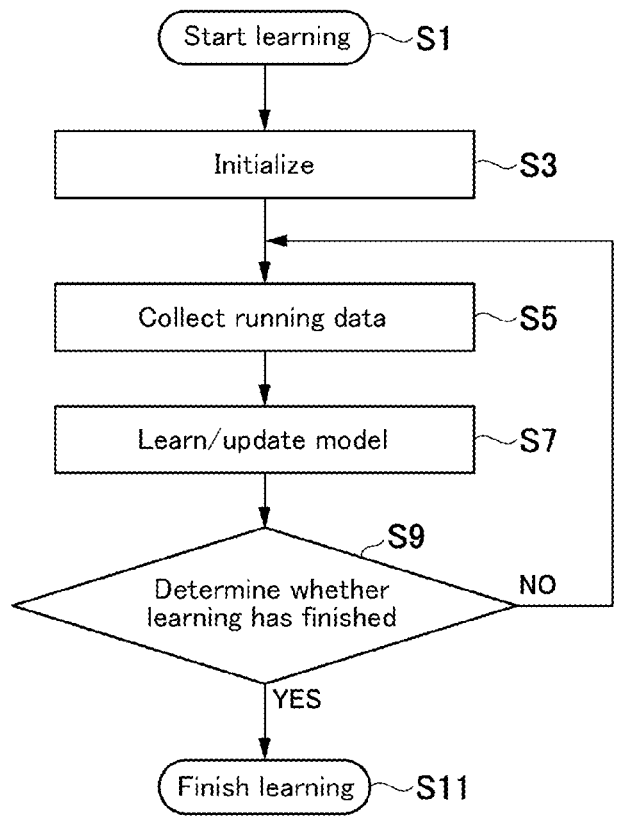
FIG. 6 is a flow chart of a training time in the control method for controlling the automatic driving robot above.
Figure 7:
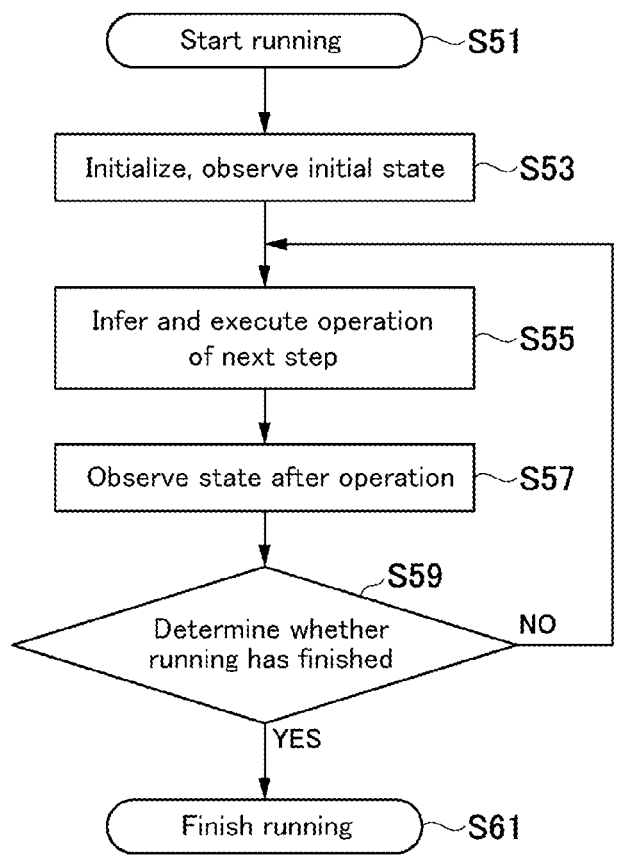
FIG. 7 is a flow chart of when the running of a vehicle is controlled for performance measurement in the automatic driving robot control method above.

Next, FIGS. 1-5, 6, and 7 will be used to explain a method for controlling the drive robot 4 by using the control device 10 of the drive robot 4 described above. FIG. 6 is a flow chart of a learning time in the control method of the drive robot 4. FIG. 7 is a flow chart of when the running of the vehicle 2 is controlled for performance measurement in the control method of the drive robot 4.

First, FIG. 6 will be used to explain actions at a time of learning an operation sequence a.

When training is started (step S1), parameters such as a running environment, the first learning model 40, and the second learning model 50, etc., are initialized (step S3).

Thereafter, running data of the vehicle 2 are collected (step S5). More specifically, running data are accumulated by the control device 10 controlling running of the vehicle 2 by using operation sequences inferred by the first learning model 40 which has not finished training and is midway through training. The running data are a combination of the running state s at the first time, the operation sequence a, the running state s at the second time, and received rewards.

Once sufficient running data are accumulated in the learning data storage unit 34, these data are used to train the first learning model 40 and the second learning model 50 by reinforcement learning, and the learning models 40, 50 are updated (step S7).

When updating of the first learning model 40 and the second learning model 50 has finished, a determination is made as to whether or not training of the first learning model 40 and the second learning model 50 has finished (step S9).

If it is determined that training has not finished (No in step S9), the process moves to step S5. That is, the control device 10 collects further running data and these data are used to repeat the update of the first learning model 40 and the second learning model 50.

If it is determined that training has finished (Yes in step S9), the training process is finished (step S11).

Next, FIG. 7 will be used to explain actions when the running of the vehicle 2 is controlled in the case of inferring an operation sequence at the time that performance measurement of the vehicle 2 is actually performed, that is, after the training of the first learning model 40 by reinforcement learning has finished.

When the vehicle 2 starts running (step S51), the running environment is initialized and the running state s at that point in time is observed as an initial state (step S53).

Observation of the running state s is carried out as follows.

The running state acquisition unit 22 acquires a running state s of the vehicle 2 at a present point in time.

The running state acquisition unit 22 acquires an accelerator pedal detection level, a brake pedal detection level, an engine rotation speed detection level, and a detected vehicle speed from various measuring instruments (not shown) that the vehicle 22 is provided with or operation history stored inside the drive robot 4, etc.

Further, the running state acquisition unit 22 acquires a command vehicle speed from the command vehicle speed storage unit 21.

The running state acquisition unit 22 transmits these acquired running states s to the learning unit 30.

The operation content inference unit 31 receives the running states s from the running state acquisition unit 22. With the time at which the running states s were received defined as a first time, the operation content inference unit 31 infers, on the basis of the received running states s, an operation sequence a of the vehicle 2 subsequent to the first time by using the trained first learning model 40 (step S55).

The operation content inference unit 31 transmits this operation sequence a inferred by the trained first learning model 40 to the vehicle operation control unit 23 of the drive robot control unit 20.

The operation content inference unit 31 uses formulae (1) and (2) above to calculate a final operation value of the drive robot 4.

The vehicle operation control unit 23 controls the drive robot 4 by generating, on the basis of the final operation value, a control signal for controlling the drive robot 4 and transmitting the control signal to the drive robot 4.

The vehicle operation control unit 23 operates the drive robot 4 during a step cycle $T_{step}$ corresponding to an inference interval by the operation content inference unit 31.

In addition, the running state acquisition unit 22 a gain acquires running states s of the vehicle 2 after operation in the same manner as step S53 (step S57).

The running state acquisition unit 22 transmits the running states s of the vehicle 2 after operation to the learning unit 30.

The control device 10 determines whether or not running of the vehicle 2 has finished (step S59).

If it is determined that running has not finished (No in step S59), the process moves to step S55. That is, the control device 10 repeats inference of an operation sequence a based on the running states s acquired in step S57 and observation of further running states s.

If it is determined that running has finished (Yes in step S59), the running process is finished (step S61).

Next, the effects of the drive robot control device and control method described above will be explained.

The drive robot (automatic driving robot) control device 10 in the present embodiment controls a drive robot 4, which is installed in a vehicle 2 and causes the vehicle 2 to run, such that the vehicle 2 runs in accordance with a defined command vehicle speed, the control device 10 being provided with a running state acquisition unit 22 that acquires a running state s of the vehicle 2 including a vehicle speed and the command vehicle speed, and an operation content inference unit 31 that infers, on the basis of the running state s, an operation sequence a, which is a sequence of operations of the vehicle 2 at a plurality of times in the future that causes the vehicle 2 to run in accordance with the command vehicle speed, by using a first learning model (operation inference learning model) 40 that was trained by machine learning to infer the operation sequence a, wherein from each operation sequence $a_i$ (i=1 to M) inferred a plurality of times in the past, operations $a_{i,t}$ (i=1 to M) corresponding to a control time $T_t$ for subsequently controlling the drive robot 4 are extracted, a weighted sum of these extracted plurality of operations $a_{i,t}$ (i=1 to M) is calculated to calculate a final operation value $a_t$, and a control signal for controlling the drive robot 4 is generated on the basis of the final operation value $a_t$ and transmitted to the drive robot 4.

Further, the drive robot (automatic driving robot) control method in the present embodiment is a control method for controlling a drive robot 4, which is installed in a vehicle 2 and causes the vehicle 2 to run, such that the vehicle 2 runs in accordance with a defined command vehicle speed, wherein the control method comprises: acquiring a running state s of the vehicle 2 including a vehicle speed and the command vehicle speed; inferring, on the basis of the running state s, an operation sequence a, which is a sequence of operations of the vehicle 2 at a plurality of times in the future that causes the vehicle 2 to run in accordance with the command vehicle speed, by using a first learning model (operation inference learning model) 40 trained by machine learning to infer the operation sequence a; extracting, from each operation sequence $a_i$ (i=1 to M) inferred a plurality of times in the past, operations $a_{i,t}$ (i=1 to M) corresponding to a control time $T_t$ for subsequently controlling the drive robot 4; calculating a weighted sum of these extracted plurality of operations $a_{i,t}$ (i=1 to M) to calculate a final operation value $a_t$; generating, on the basis of the final operation value $a_t$, a control signal for controlling the drive robot 4; and transmitting the control signal to the drive robot 4.

According to a configuration such as that described above, on the basis that the first learning model 40 infers an operation sequence a, the running state of the vehicle 2 includes a command vehicle speed. Further, the first learning model 40 is trained by machine learning so as to infer an operation sequence a, which is a sequence of operations of the vehicle 2 at a plurality of times in the future, that causes the vehicle 2 to run in accordance with the command vehicle speed. Due thereto, it is possible for the first learning model 40 to infer an operation sequence a that conforms to the command vehicle speed with high accuracy.

Here, according to a configuration such as that described above, operations $a_{i,t}$ (i=1 to M) to be executed in the same control time $T_t$ are respectively inferred in a plurality of inferences in the operation content inference unit 31, the operations $a_{i,t}$ are extracted and a weighted sum thereof is calculated, and a final operation value of the control time $T_t$ is calculated.

That is, when calculating the final operation value $a_t$ of a control time Tt, a weighted sum is calculated for a plurality of operations derived in a plurality of inferences, and therefore, a series of operations along a temporal sequence is smoothed in comparison with a case in which only operations derived in a single inference serve as the basis therefor.

Further, the targets for which a weighted sum is to be calculated when calculating the final operation value $a_t$ are operations $a_{i,t}$ (i=1 to M) to be executed in the same control time $T_t$ in each of a plurality of inferences. Due thereto, operations at another past or future time different to the control time $T_t$ are not targets for calculation. Thus, the influence of operations in other times on computation are eliminated and detriments to conformity to a command vehicle speed are suppressed.

Due to the foregoing, it is possible to realize an automatic driving robot control device and control method that enable a vehicle to be operated smoothly while also being caused to conform to a command vehicle speed with high accuracy.

For example, it is possible to consider an implementation configured, with an objective of reducing adverse effects on the vehicle 2, such that when the vehicle operation control unit 23 calculates a final operation value $a_t$, the accelerator pedal and the brake pedal are not operated simultaneously, and if the first learning model 40 outputs operations for both the accelerator pedal and the brake pedal, the pedal that was the target in the previous operation is set as the operation target. In such a case, when a pedal operation is switched to another pedal, it is desirable that the first learning model 40 infers an operation that first sets the operation of both pedals to zero.

For example, in cases in which a low pass filter or a moving average with operations of another time, etc., is applied to an operation, even if an output of a value of zero is desired in order to switch a pedal operation at a given time, there may be cases in which an influence of an operation at another time not having a zero value is received, a non-zero value is outputted, and as a result thereof, the pedal operation cannot be switched.

With regard to the foregoing, according to a configuration such as that described above, if operations in that time in each of a plurality of inferences are appropriately set to zero, it becomes possible to output a value of zero as an operation in that time, and therefore, a delay in switching a pedal operation will not occur.

Furthermore, since the targets for which a weighted sum is to be calculated are operations $a_{i,t}$ (i=1 to M) to be executed in the same control time $T_t$ in a plurality of different inferences, it is possible to improve the robustness of a prediction in comparison with a case in which computations are carried out with operation results of another time.

Further, the weights $\alpha_i$ (i=1 to M) used in the weighted sum are set such that the further back in the past is an inferred time $T_i$ (i=1 to M) of an operation sequence $a_i$ (i=1 to M) for which operations $a_{i,t}$ (i=1 to M) to be used in the calculation of the weighted sum have been extracted, the smaller the value becomes.

According to a configuration such as that described above, the more recent is a running state s which is inputted into the operation content inference unit 31 and serves as a basis for the operation sequence $a_i$ (i=1 to M) to be inferred, the larger is the weight $\alpha_i$ (i=1 to M) applied to the outputted operation sequence $a_i$ (i=1 to M) corresponding thereto. Due thereto, regardless of past inference results being taking into consideration for most recent inference results in order to calculate a final operation value $a_t$, it is possible to reduce potential detriment to conformity to a command vehicle speed due to the most recent inference results being excessively influenced by past inference results.

Further, the vehicle operation control unit 23 calculates a final operation value $a_t$ by applying, in formula (2) above, the weights $\alpha_i$ (i=1 to M) which were calculated by using formula (1) above on the basis of the coefficient x being greater than 1, with a plurality of operations extracted for a control time $T_t$ from each operation sequence $a_i$ (i=1 to M, the value of i being greater the further back in the past is a time $T_i$ (i=1 to M) for which an operation sequence has been inferred) inferred a plurality of times in the past being defined as $a_{i,t}$ (i=1 to M).

According to a configuration such as that described above, a final operation value $a_t$ can be appropriately calculated.

First Modification of Embodiment

Next, there follows an explanation of a modification of the drive robot control device and control method indicated as the first embodiment above. In the drive robot 4 control device in the present modification, the setting of the weight $\alpha_i$ (i=1 to M) differs from that in the drive robot 4 control device 10 of the embodiment described above.

More specifically, in the present modification, the range of values which may exist as a vehicle speed is classified into a plurality of vehicle speed regions by one or more vehicle speed classification threshold values, and for each of the plurality of vehicle speed regions, the coefficient x is set so as to have larger value for a vehicle speed region corresponding to a lower vehicle speed.

The weights $\alpha_i$ (i=1 to M) may have different ranges appropriate for each vehicle speed region of the vehicle 2. For example, the lower is the vehicle speed in a vehicle speed region, the greater the requirement for a prompt pedal operation in order to conform to the command vehicle speed.

Here, in formula (1) above, the greater is the value of the coefficient x, the smaller is the value of the weight $\alpha_i$ when i is large, and the greater is the value of the weight $\alpha_i$ when i is small. That is, by setting the value of the coefficient x to be large, when calculating the final operation value $a_t$ by using a weighted sum, the value of a weight $\alpha_i$ to be multiplied in correspondence with a newly inferred operation sequence $a_i$ is made larger and it is possible to increase the level importance of a prediction close to the present time.

For example, by determining through experimentation in advance values of the coefficient x suitable for each vehicle region and controlling the drive robot 4 while changing x in response to a vehicle speed, it is possible to achieve, with good balance, both smoothness of operations and conformity to a command vehicle speed.

Needless to say, the first modification exhibits effects similar to those of the embodiment that has already been explained.

Second Modification of Embodiment

Figure 8:
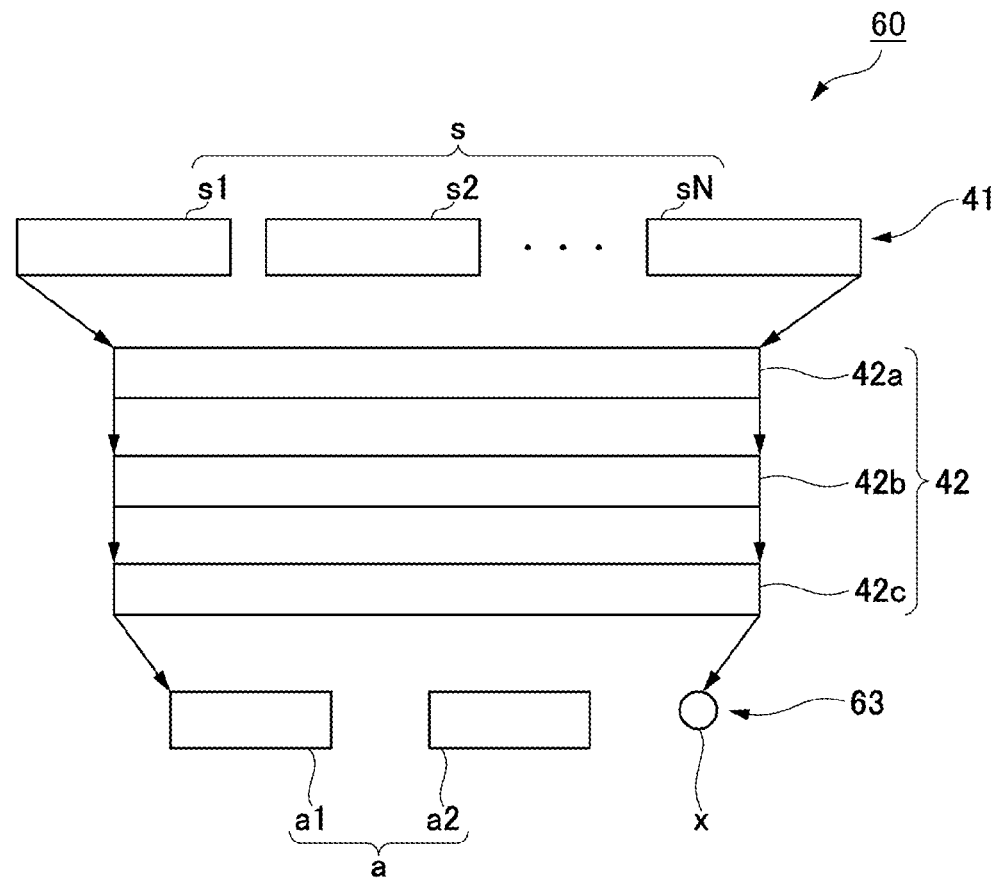
FIG. 8 is a block diagram of a first learning model of the automatic driving robot in a second modification of the embodiment above.
Figure 9:
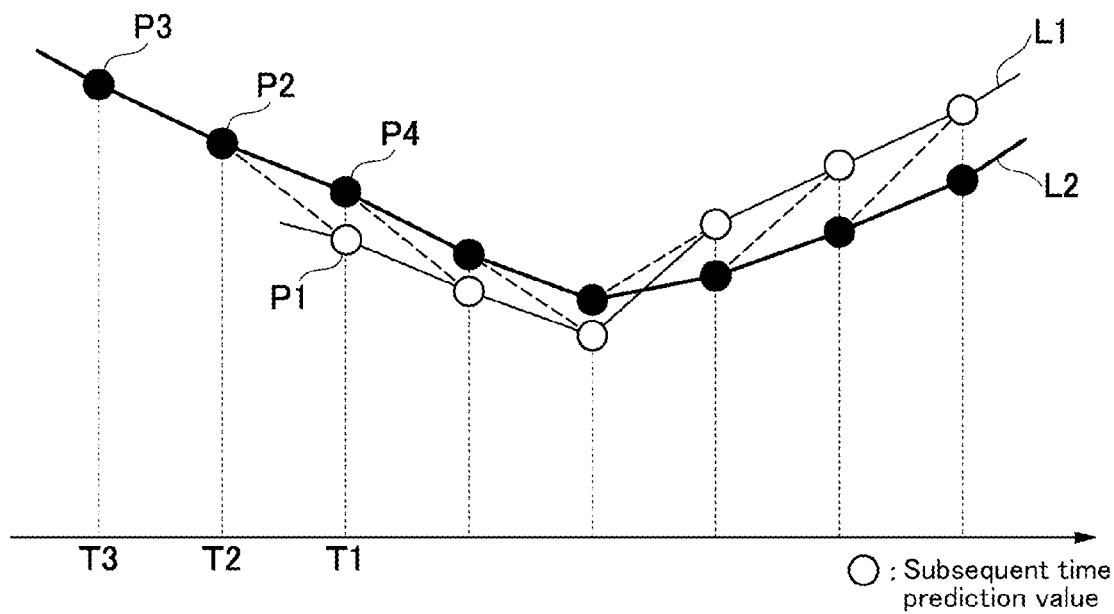
FIG. 9 is an explanatory diagram related to a problem in the prior art.

Next, FIG. 8 will be used to explain a modification of the drive robot control device and control method indicated as the embodiment above. FIG. 8 is a block diagram of a first learning model 60 of the drive robot control device in the present modification. The drive robot 4 control device in the present modification differs from the drive robot 4 control device 10 of the embodiment described above in that the coefficient x is an output value of the first learning model (operation inference learning model) 60, and the first learning model 60 is trained by machine learning so that the coefficient x is inferred on the basis of a running state s.

That is, in the first learning model 60 shown in FIG. 8, a node corresponding to the coefficient x is added as an output node 63, and the first learning model 40 is trained by reinforcement learning so that the coefficient x becomes a value that can enhance the conformity to a vehicle speed.

Needless to say, the second modification exhibits effects similar to those of the embodiment that has already been explained.

Note that the drive robot control device and control method according to the present invention are not limited to the above embodiment and modifications explained by referring to the drawings, and various other modifications may be contemplated within the technical scope thereof.

For example, in the embodiment described above, it was explained that when the first learning model 40 and the second learning model 50 are trained, the vehicle 2 was caused to actually run for running data to be observed and acquired. However, the present invention is not limited to the foregoing case. For example, at a time of training, a simulator may be used instead of the vehicle 2.

Further, in the modification described above, the targets for operation are the accelerator pedal 2c and the brake pedal 2d, and the running state was configured so as to include detection levels of the accelerator pedal 2c and the brake pedal 2d. However, the present invention is not limited thereto.

Further, the configurations of the learning models 40, 50 are, needless to say, not limited to those described in the embodiment above. For example, it is possible to anticipate many modifications of the learning models 40 and 50 such as those wherein the number of intermediate layers 42, 52 is less than three or more than three, etc. Any kind of configuration, as long as not detrimental to the gist of the present invention, may be provided.

Furthermore, in the embodiment described above, the first learning model 40 is trained by reinforcement learning. However, the present invention is not limited thereto, and a different machine learning method, as long as not detrimental to the gist of the present invention, may be used to perform training.

Aside from the above, the configurations described in the embodiment and modifications above may be adopted or rejected and may be changed, as appropriate, to other configurations as long as there is no departure from the gist of the present invention.

REFERENCE SIGNS LIST

1 Testing device
2 Vehicle
3 Chassis dynamometer
4 Drive robot (automatic driving robot)
10 Control device
20 Drive robot control unit
21 Command vehicle speed storage unit
22 Running state acquisition unit
23 Vehicle operation control unit
30 Learning unit
31 Operation content inference unit
32 Reward calculation unit
33 Reinforcement learning unit
34 Learning data storage unit
40, 60 First learning model (operation inference learning model)
50 Second learning model
Q Action value function
s Running state
sN Command vehicle speed
a, $a_i$ (i=1 to M) Operation sequence
$a_{i,t}$ (i=1 to M) Operation
$T_i$ (i=1 to M) Time
$T_t$ Control time

The invention claimed is:

1. An automatic driving robot control device that controls an automatic driving robot, which is installed in a vehicle and causes the vehicle to run, such that the vehicle runs in accordance with a defined command vehicle speed, wherein the automatic driving robot control device comprises:
  a running state acquisition unit that acquires a running state of the vehicle including a vehicle speed and the command vehicle speed;
  an operation content inference unit that infers, on the basis of the running state, an operation sequence, which is a sequence of operations of the vehicle at a plurality of times in the future that causes the vehicle to run in accordance with the command vehicle speed, by using an operation inference learning model that was trained by machine learning to infer the operation sequence; and a vehicle operation control unit that extracts, from each of the operation sequences inferred a plurality of times in the past, the operations corresponding to a control time for subsequently controlling the automatic driving robot, calculates a weighted sum of these extracted plurality of operations to calculate a final operation value, generates, on the basis of the final operation value, a control signal for controlling the automatic driving robot, and transmits the control signal to the automatic driving robot.

2. The automatic driving robot control device according to claim 1, wherein weights used in the weighted sum are set so as to have a smaller value the further back in the past is a time for which was inferred the operation sequence from which the operations to be used in the calculation of the weighted sum were extracted.

3. The automatic driving robot control device according to claim 2, wherein the vehicle operation control unit calculates the final operation value $a_t$ by applying, in formula (2) below, weights $\alpha_i$ (i=1 to M) which were calculated by using formula (1) below on the basis of a coefficient x being greater than 1, with a plurality of operations extracted for the control time $T_t$ from each operation sequence $a_i$ (i=1 to M, the value of i being greater the further back in the past is a time for which the sequence was inferred) inferred a plurality of times in the past being defined as $a_{i,t}$ (i=1 to M).

$$a_t = \sum_{i=1}^{M} \alpha_i a_{i,t} \quad (2)$$

4. The automatic driving robot control device according to claim 3, wherein:
the range of values that may exist as the vehicle speed is classified into a plurality of vehicle speed regions by one or more vehicle speed classification threshold values; and for each of the plurality of vehicle speed regions, the coefficient x is set so as to have a larger value the lower is the vehicle speed to which the vehicle speed region corresponds.

5. The automatic driving robot control device according to claim 3, wherein: the coefficient x is an output value of the operation inference learning model; and
the operation inference learning model is trained by machine learning so as to infer the coefficient x on the basis of the running state.

6. An automatic driving robot control method for controlling an automatic driving robot, which is installed in a vehicle and causes the vehicle to run, such that the vehicle runs in accordance with a defined command vehicle speed, wherein the automatic driving robot control method comprises:
acquiring a running state of the vehicle including a vehicle speed and the command vehicle speed;
inferring, on the basis of the running state, an operation sequence, which is a sequence of operations of the vehicle at a plurality of times in the future that causes the vehicle to run in accordance with the command vehicle speed, by using an operation inference learning model that was trained by machine learning to infer the operation sequence; and
extracting, from each of the operation sequences inferred a plurality of times in the past, the operations corresponding to a control time for subsequently controlling the automatic driving robot, calculating a weighted sum of these extracted plurality of operations to calculate a final operation value, generating, on the basis of the final operation value, a control signal for controlling the automatic driving robot, and transmitting the control signal to the automatic driving robot.

7. The automatic driving robot control device according to claim 4, wherein: the coefficient x is an output value of the operation inference learning model; and
the operation inference learning model is trained by machine learning so as to infer the coefficient x on the basis of the running state.

* * * * *